(12) United States Patent
Hinds et al.

(10) Patent No.: US 6,786,647 B1
(45) Date of Patent: Sep. 7, 2004

(54) MECHANICALLY CONSTRAINED CONNECTION

(75) Inventors: Mark R. Hinds, Ottawa (CA); Richard J. Glover, Stittsville (CA); David J. Pell, Carp (CA); Bhupendra Patel, Aylmer (CA); Vincent E. Somoza, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 99 days.

(21) Appl. No.: 10/097,266

(22) Filed: Mar. 15, 2002

Related U.S. Application Data
(60) Provisional application No. 60/276,045, filed on Mar. 16, 2001.

(51) Int. Cl.[7] .................................................. G02B 6/38
(52) U.S. Cl. ........................................... 385/55; 385/76
(58) Field of Search ..................... 385/55, 76; 439/131, 439/286, 288, 10, 376, 374, 341, 534

(56) References Cited

U.S. PATENT DOCUMENTS

| | | | | |
|---|---|---|---|---|
| 5,446,822 A | * | 8/1995 | Keith .......................... | 385/135 |
| 5,639,261 A | * | 6/1997 | Rutkowski et al. .......... | 439/534 |
| 5,708,742 A | * | 1/1998 | Beun et al. .................... | 385/53 |
| 5,887,100 A | * | 3/1999 | Robertson ..................... | 385/76 |
| 5,949,946 A | * | 9/1999 | Debortoli et al. ........... | 385/134 |
| 6,550,977 B2 | * | 4/2003 | Hizuka ......................... | 385/55 |

* cited by examiner

*Primary Examiner*—Hae Moon Hyeon

(57) ABSTRACT

An optical connector is secured to a body member which can be rotated away from the outer surface faceplate of the circuit pack for inspection, cleaning or repair. The body member is otherwise constrained to move along the outer surface of the circuit pack in a fixed path such that the connector of one module can mate through an adapter with a corresponding connector on another module.

18 Claims, 9 Drawing Sheets

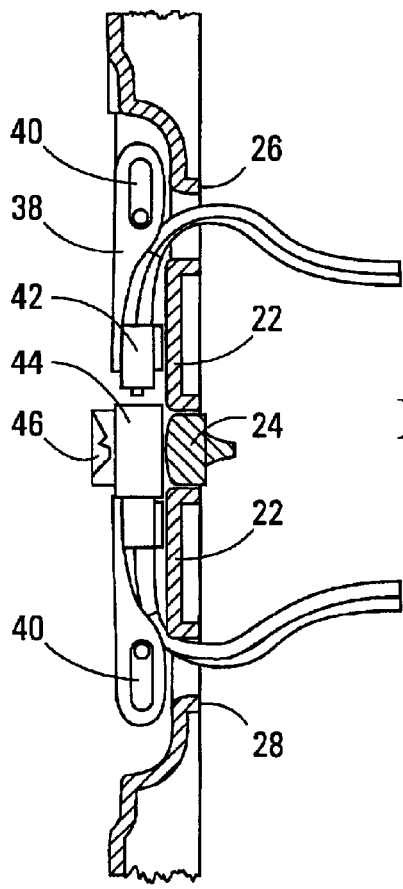
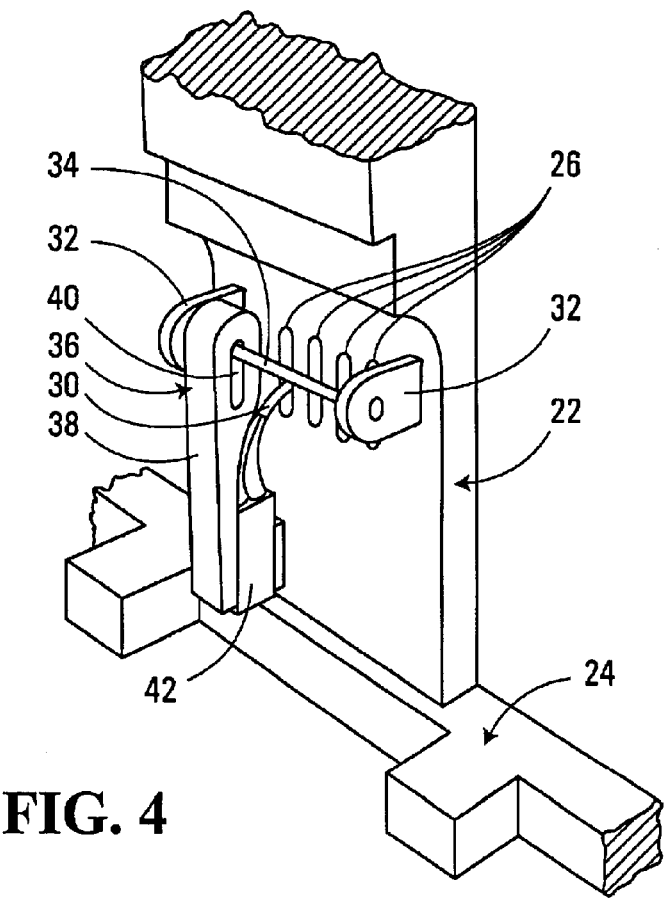
FIG. 3
FIG. 4

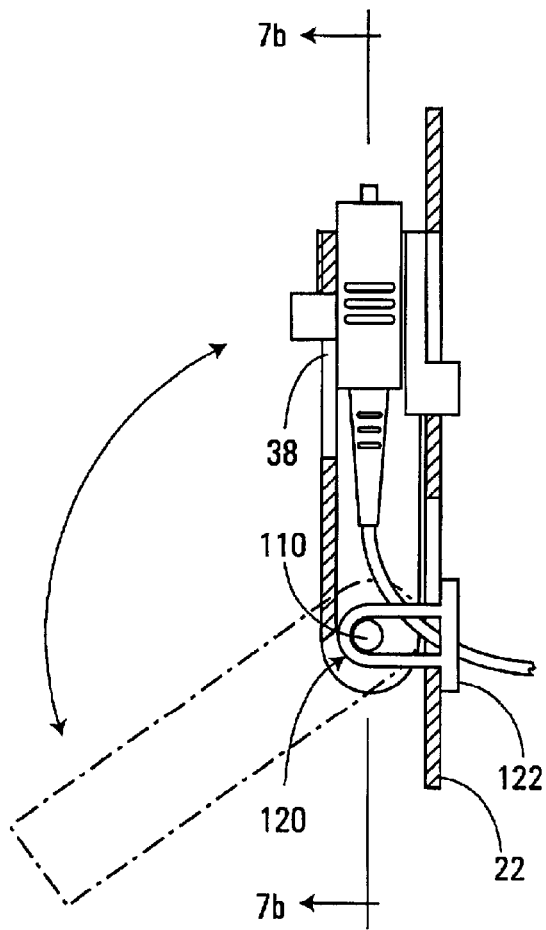
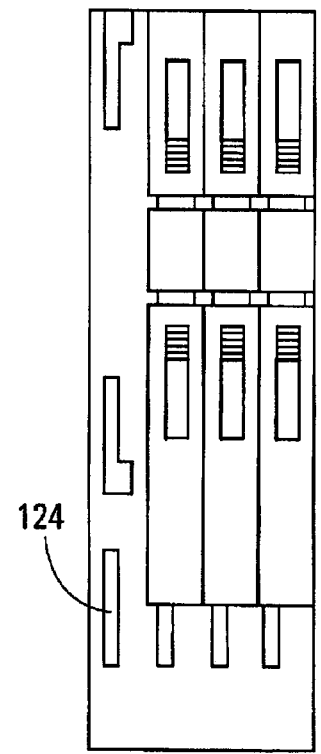
FIG. 7A
FIG. 7C
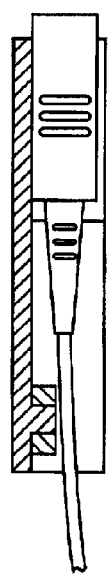
FIG. 7B
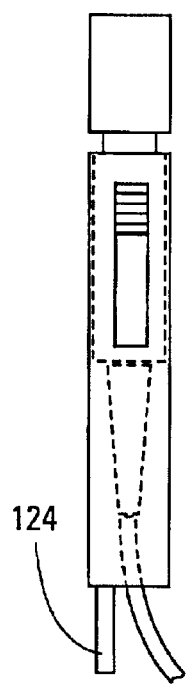
FIG. 7D

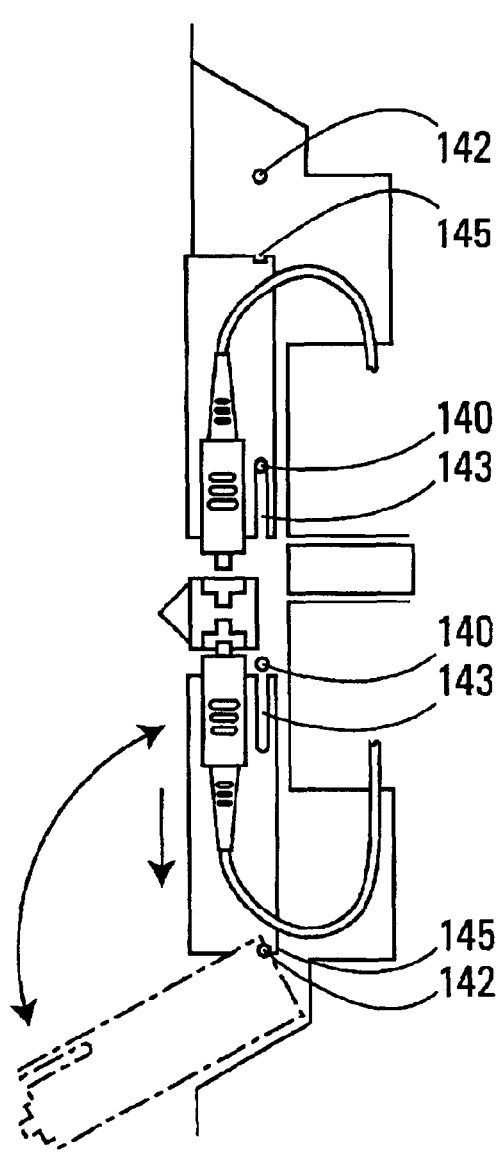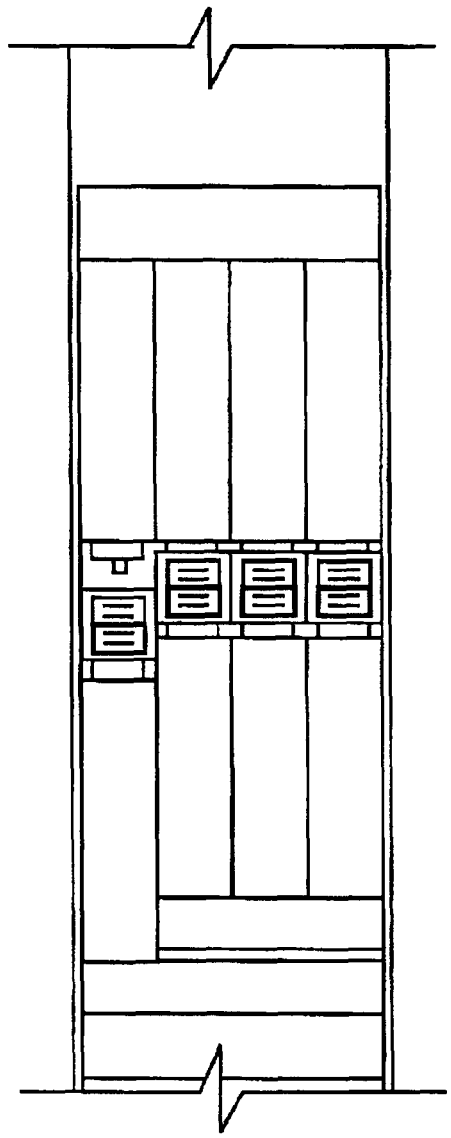
FIG. 9A  FIG. 9B

MECHANICALLY CONSTRAINED CONNECTION

This application claims the benefit of U.S. Provisional Application No. 60/276,045, filed Mar. 16, 2001.

FIELD OF THE INVENTION

This invention relates to cable connectors, particularly but not exclusively, for interconnecting optical fiber cables on a circuit pack or module to optical fiber cables on an adjacent circuit pack or module.

BACKGROUND OF THE INVENTION

In order to interconnect optical fiber cables of one circuit pack or module and optical fiber cables of another circuit pack typically intermediate optical patch cords are used.

One problem with the known technique is documentation must be provided to tell the installer which optical cables are to be interconnected.

Reading and understanding such installation instructions is time-consuming and, unless the installer is extremely careful, errors in interconnection can easily occur.

Additionally, the slack or unused portion of the patch cords gives rise to a storage problem and also increases optical path loss.

SUMMARY OF THE INVENTION

The invention overcomes these problems by eliminating the patch cord and an extra adapter. Each optical fiber cable is terminated with an optical connector on a pigtail leaving the module. The optical connector is secured to a body member which can be rotated away from the outer surface faceplate of the circuit pack for inspection, cleaning or repair. The body member is otherwise constrained to move along the outer surface of the circuit pack in a fixed path such that the connector of one module can mate through an adapter with a corresponding connector on another module.

Typically an adapter is used between the terminating means of the cable connector and the terminating means of another cable connector. In an alternative embodiment instead of the body member moving along the outer surface of the circuit pack, only the adapter moves to effect mating or unmating. In this case, the standard known adapter could not be used but a special adapter would have to be designed.

Instead of an arrangement involving a rotation of the body member, an alternate embodiment involves an arrangement whereby, when the optical connectors are disengaged, the body member can be translated away from the faceplate in a direction perpendicular to its surface for inspection, cleaning and repair of the secured optical connector, and whereby the body member is capable of being translated parallel to the outer surface of the faceplate to engage and disengage the connectors, when it is in substantial contact with the surface of the faceplate.

In this way only the desired connection between the two modules can be made. The installer needs no documentation to decide what to interconnect and cannot make errors in interconnection. Ease, speed and accuracy of installation are improved. Storage space of excess patch cord is eliminated and path loss is reduced.

BRIEF DESCRIPTION OF THE DRAWINGS

FIG. 3 is a schematic side view illustrating details of the optical interconnection according to a preferred embodiment of the invention;

FIG. 4 is a perspective view illustrating part of the interconnection shown in FIG. 3;

FIG. 7 depicts a front sectional view, a front view, a side section and a faceplate front view of an alternative embodiment using a pivot assembly which tracks on the faceplate;

FIG. 9 depicts a side view and a faceplate view of another alternative embodiment, wherein two separate pins are used for rotation and translation.

DETAILED DESCRIPTION OF THE PREFERRED EMBODIMENTS

Figure 1:
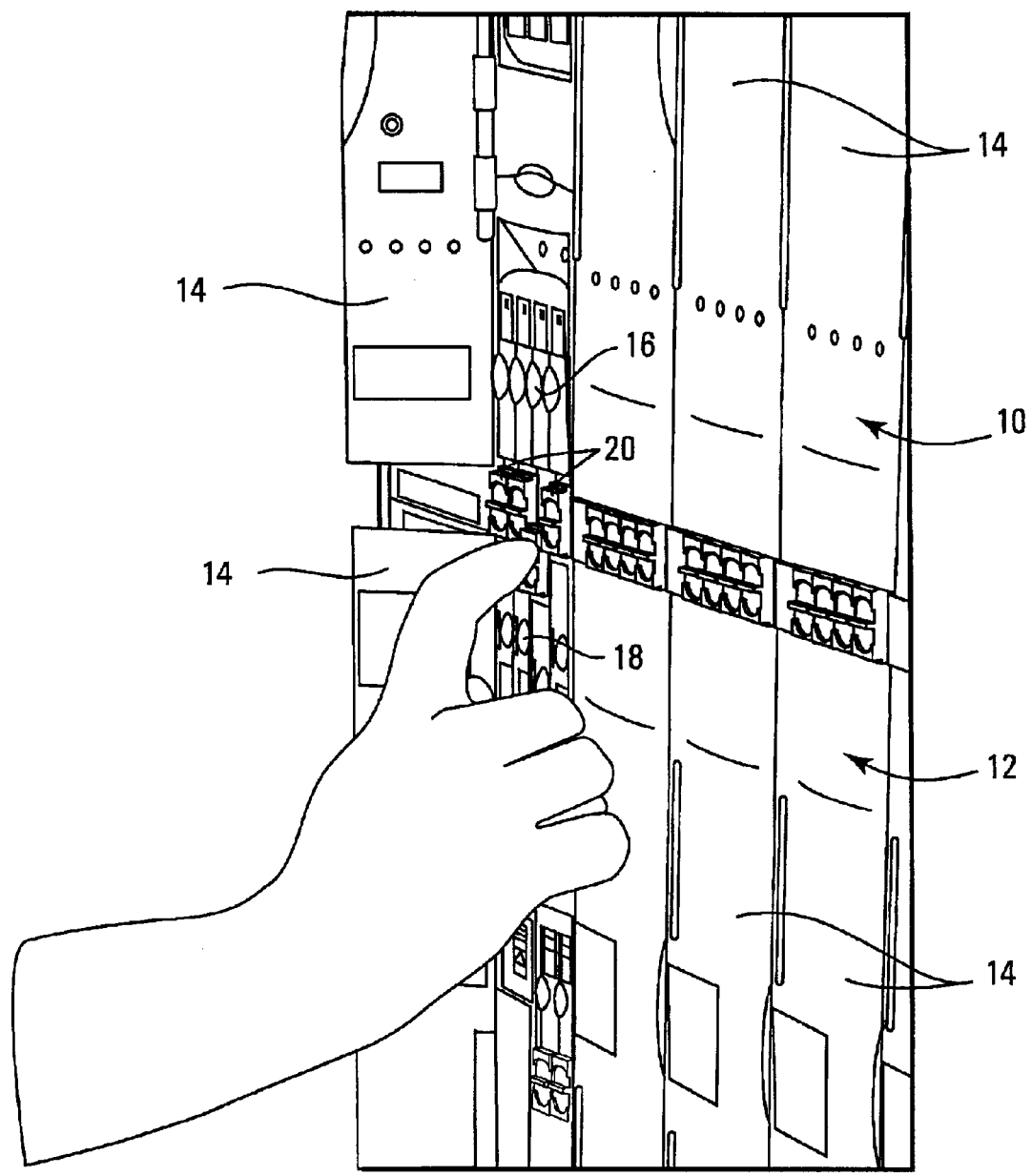
FIG. 1 is a perspective view illustrating the fronts of one set of circuit packs mounted above another set of circuit packs.
Figure 2:
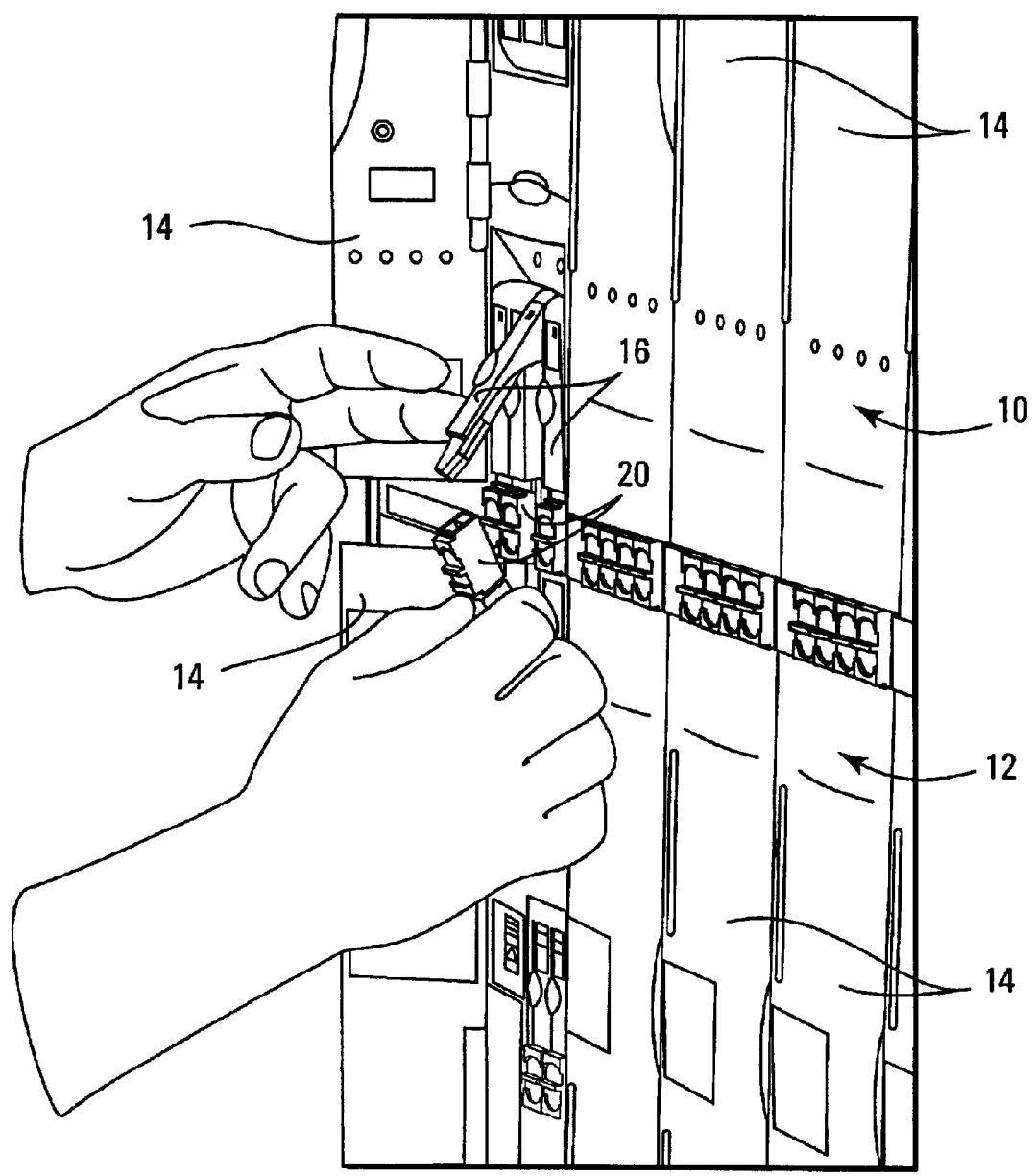
FIG. 2 illustrates an optical interconnection between an upper circuit pack and a lower circuit pack of the circuit packs shown in FIG. 1.

Referring to FIGS. 1 and 2, a first plurality of upper circuit packs 10 are shown mounted in shelving immediately above a second plurality of circuit packs 12 also mounted in shelves. The circuit packs 10 may for example, be optical multiplexer/demultiplexers and the circuit packs 12 may, for example, be dispersion compensation modules but of course the invention is not limited to use with these types of circuit packs.

The front edges of both sets of circuit packs are shown in FIGS. 1 and 2. Each front edge has a cover 14 and it can be seen that the cover of one of the upper circuit packs 10 is open and the cover of the lower circuit pack 12 that is directly below that circuit pack 10 is also open to reveal four connectors 16 in the upper circuit pack 10 and four complementary connectors 18 in the lower circuit pack 12. Four adapters 20 are also shown between connectors 16 and corresponding connectors 18.

The detailed structure of connectors 16, 18 and adapters 20 will now be described with reference to FIGS. 3 and 4. The edge of a circuit pack 10 or 12 is covered by a faceplate 22 and a cross member 24 separates the upper shelves which receive the upper circuit packs 10 from the lower shelves which receive the lower circuit packs 12. Four elongate slots 26 extend through each upper faceplate quite close to the lower ends of the upper circuit packs 10, i.e. quite close to the cross member. Similarly, four elongate slots 28 (seen in FIG. 3) extend through each lower faceplate quite close to the upper ends of lower circuit packs 12. An optical fiber cable 30 extends from the interior of each circuit pack through one of the slots 26 or 28 and emerges onto the outer surface of the faceplate 22. The interconnection system of the invention is designed to interconnect the four optical fiber cables 30 of each upper circuit pack 10 with the four optical fiber cables 30 of the corresponding lower circuit pack 12 directly below.

Mounted on each faceplate adjacent the slots 26 or 28 is a pair of brackets 32 supporting therebetween a pivot pin 34 running across the width of the faceplate. Four optical connectors 36 are carried on each pivot pin but only one is shown in FIGS. 3 and 4. The connectors 36 are identical and each comprises a body member 38 having an elongate slot 40 through which is received the pivot pin 34. Near an opposite end of the body member an optical fiber connector 42 is mounted and terminates an end of one of the cables 30.

As can be seen particularly in FIG. 3, the optical connectors 36 mounted on the upper circuit packs 10 extend downwards such that the optical fiber connectors 42 are located proximate the cross member 24. Similarly, the optical connectors 36 mated on the lower circuit packs 12 extend upwards such that the optical fiber connectors 42 are located proximate the cross member 24. An optical adapter 44 for interconnecting an upper optical fiber connector 42 to a lower optical fiber connector 42 is located between the two optical fiber connectors as shown in FIG. 3. In the preferred embodiment the adapter 44 would be an SC or an MU type with a push-pull movement and spring loaded capture mechanism. However, other commonly available connector types (FU, ST, LC, MT-RJ, etc . . . ) or future connector types could be incorporated into similar embodiments by those skilled in the art.

The slots 40 in the body members 38 permit the body members to be moved parallel to the surface of the faceplate upwardly or downwardly to effect mating or unmating of the upper and lower connectors through the optical fiber connectors 42 and adapter 44. The outer surface of the faceplate 22 of an upper circuit pack 10 may be arranged to be coplanar or virtually coplanar with the outer surface of the faceplate 22 of the corresponding lower circuit pack 12 such that these surfaces constrain the two connectors to move into alignment with each other. The sides of the body members 38 engaging with the sides of adjacent body members 38 also assist in this alignment. Other means for constraining the body members to move directly upwards or downwards into alignment with corresponding body members may also be provided.

The adapter 44 may also be able to compensate for slight misalignment between upper and lower connectors.

Referring again to FIGS. 1 and 2, a connector of a lower circuit pack 12 may be disconnected from a mating connector of an upper circuit pack 10 by engaging with a finger (FIG. 1) the front surface 46 of the adapter 44 between the two connectors and sliding the adapter 44 and the body member 38 of the lower connector downwardly, the slot 40 in that body member accommodating such movement. Then, when the connectors have been unmated they both may be manually rotated as shown in FIG. 2 away from the outer surfaces of the circuit packs for access to permit cleaning, repair or the like.

Mating of the connectors again may be achieved by rotating them back to the vertical position and then sliding the adapter and body member of the lower connector upwardly.

Although FIG. 3 shows slots 40 in upper and lower connectors it should be apparent that only one slot is required and this may be in the upper or the lower connector body member.

Figure 5:
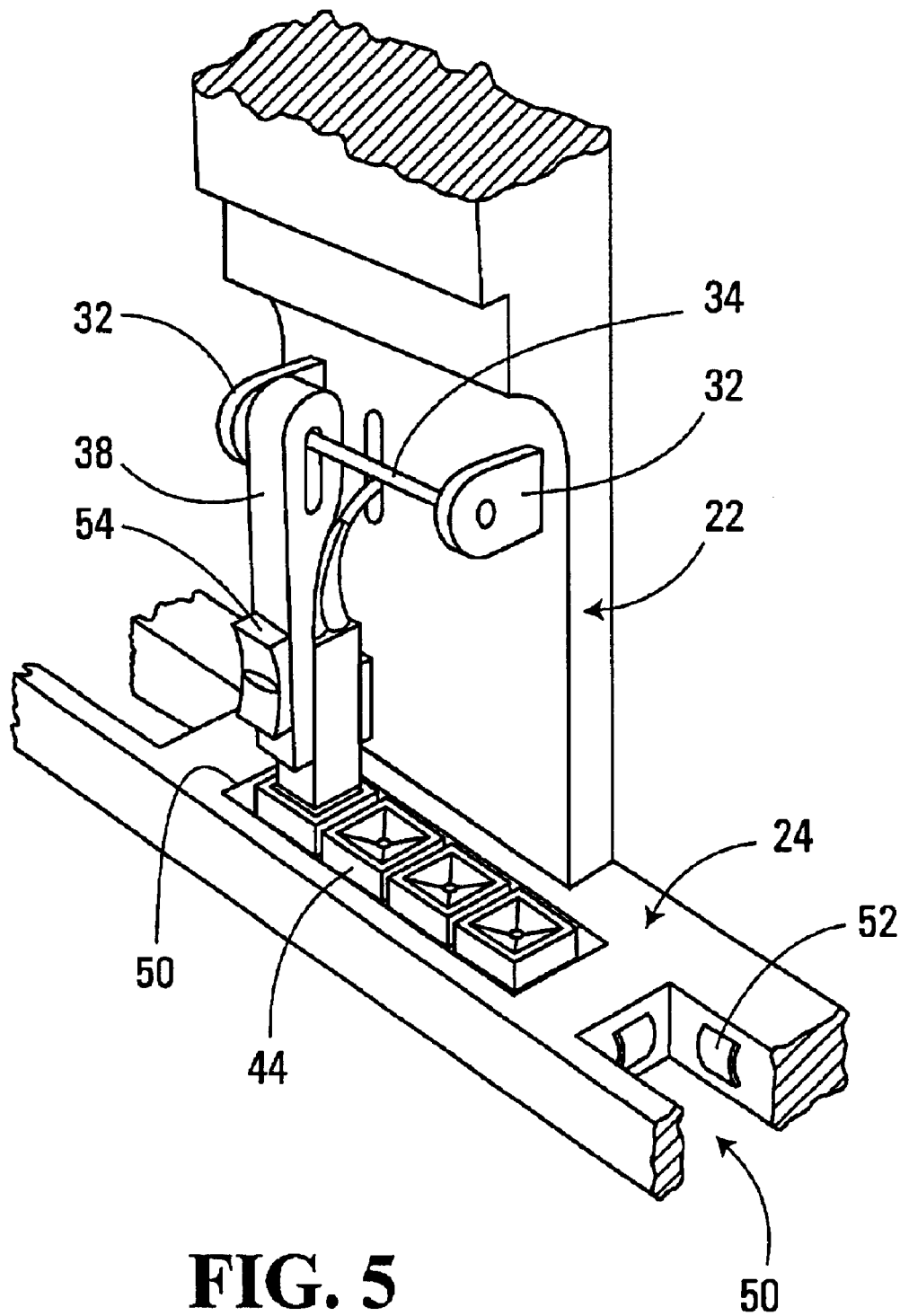
FIG. 5 is a view similar to FIG. 4 but illustrating another embodiment of the invention.

FIG. 5 illustrates a second embodiment of the invention in which the adapters 44 are not free to rotate outwardly with the optical connector body members. Instead, the adapters are held within the cross member 24 which is extended outwardly to define a channel or channels 50 containing springs 52 on its edges to retain the adapters and permit a certain amount of float to accommodate minor misalignment. In this case the upper and lower body members must be provided with slots 40 to permit mating and unmating with respect to the adapter. A finger engaging portion 54 on the front surface of the body member is also illustrated in this embodiment.

Figures 6A, 6B:
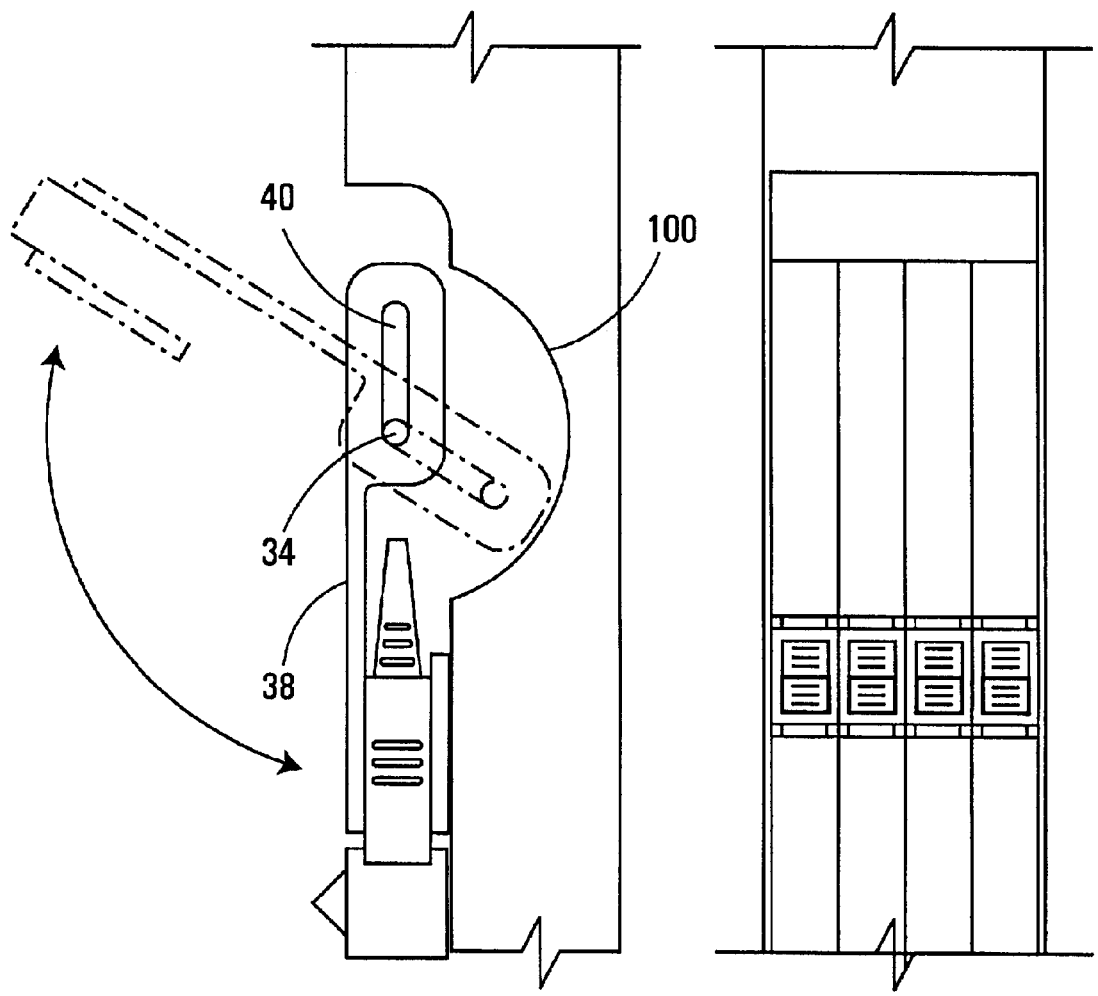
FIG. 6 shows a side view of a variation of the preferred embodiment wherein the faceplate is recessed.

FIG. 6 shows a side view of a variation to the preferred embodiment. In this arrangement, the faceplate includes an indent or recess 100 directly adjacent to the bracket 32 and pin 34 to allow full rotation of the body member 38 in a disengaged state.

FIG. 7 depicts a front sectional view, a front view, a side section and a faceplate front view of an alternative embodiment. In this embodiment the body member 38 securing the connector rotates on a pivot 110, and a pivot assembly 120 translates parallel to the faceplate 22. The body member 38 together with the pivot assembly 120 is aligned and guided by a runner .122 on the pivot assembly that fits into a track 124 in the faceplate 22. The track aligned with a mating direction.

Figure 8A:
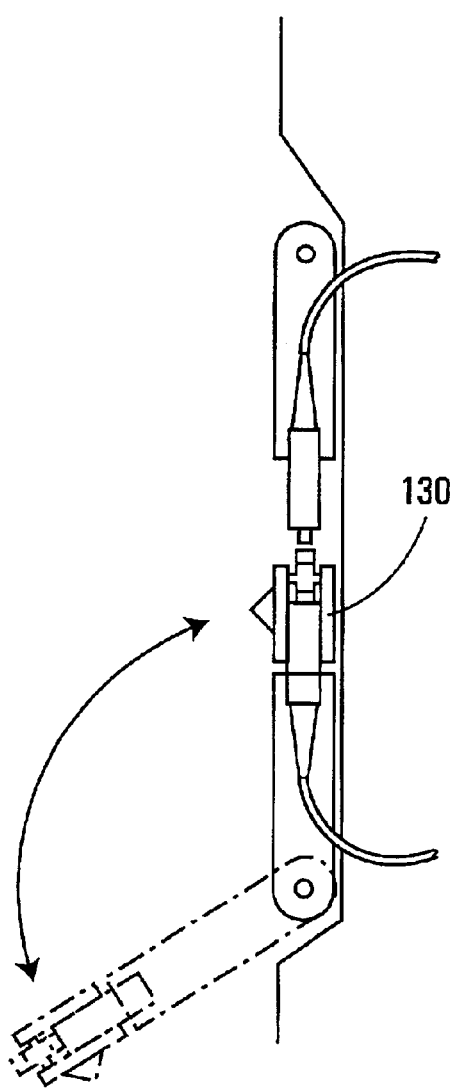
FIG. 8 depicts a side view and a faceplate front view of another alternative embodiment wherein the connector adapter assembly translates.
Figure 8B:
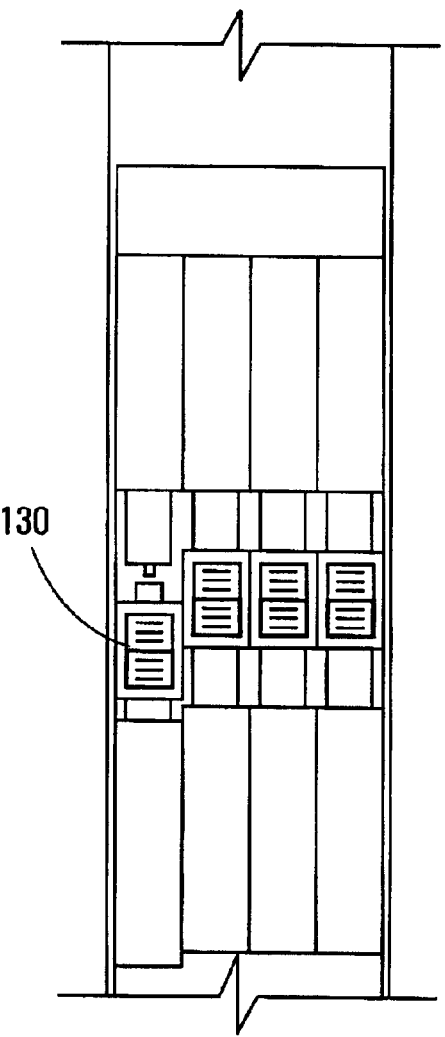

FIG. 8 depicts a side view and a faceplate front view of another alternative embodiment. In this embodiment, the body member rotates on a pivot and a connector-adapter assembly 130 is designed to allow the adapter to translate to engage or disengage the corresponding connector. This requires a specially designed adapter.

FIG. 9 depicts a side view and a faceplate view of another alternative embodiment. In this embodiment there are two separate pins, one used for translation 140 and the other for rotation 142. The body member comprises both a slot for translation 143 and a pivot and a capture mechanism (not shown) to engage the pin during rotation.

Figure 10A:
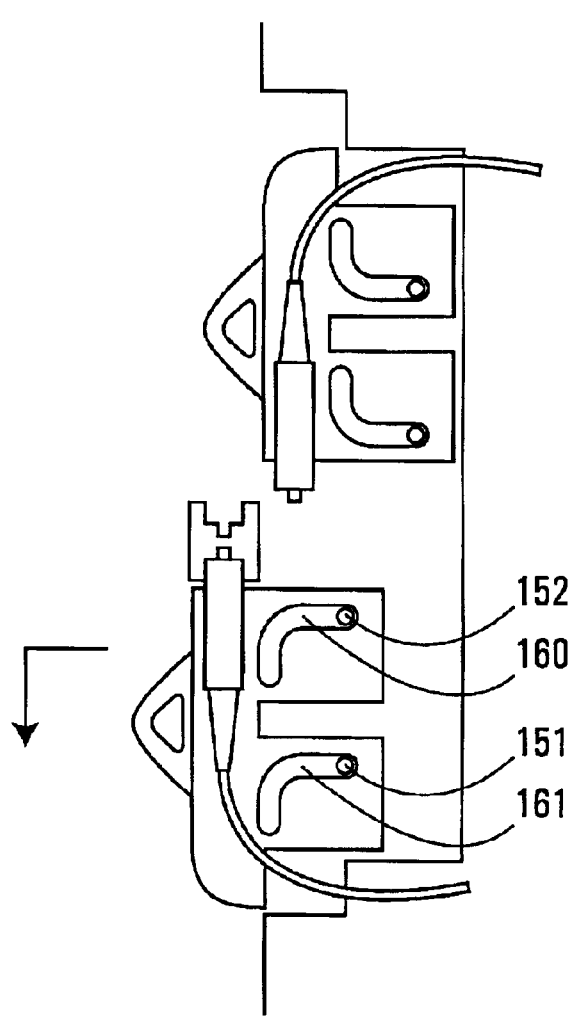
FIG. 10 depicts a side view and a faceplate front view of another alternative embodiment.
Figure 10B:
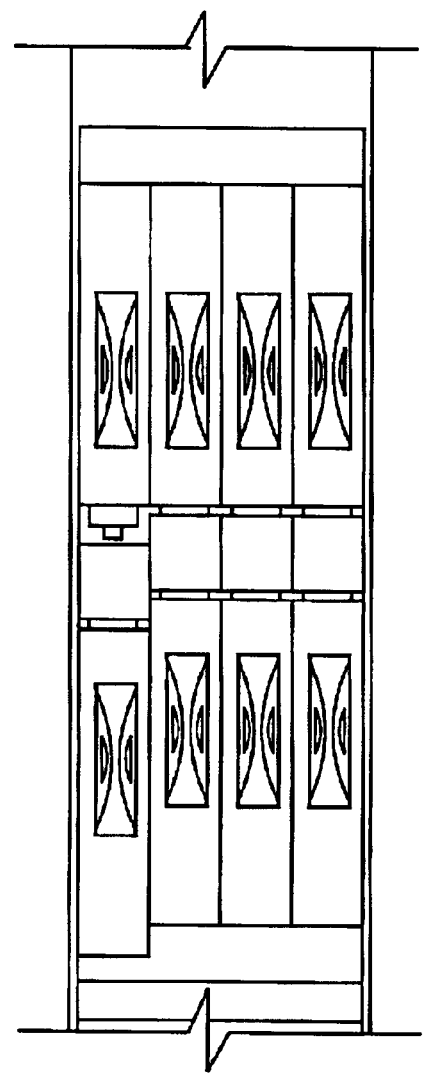

FIG. 10 depicts a side view and a faceplate front view of another alternative embodiment. In this embodiment the connector translates parallel to the surface of the faceplate for mating with another connector and perpendicular to the surface of the faceplate for repair, cleaning and inspection, via fixed pins 151, 152 on the frame or faceplate "L" shaped slots 160, 161 in the body member.

Although the invention has been described in relation to optical fiber cables it is equally useful in interconnecting electrical cables. It may involve only optical to optical or electrical to electrical or optical and electrical to optical and electrical. Furthermore, each body member may be associated with more than one optical or electrical cable. That is to say one body member may carry several connectors for interconnecting several connectors on another body member.

What is claimed is:

1. A cable connector for interconnecting a first cable in a module to a second cable, the cable connector comprising:
   terminating means for terminating an end of the first cable;
   a body member supporting the terminating means;
   means for constraining the body member to move parallel to an outer surface of the module for mating of the cable connector with a complementary cable connector attached to the second cable; and
   means permitting movement of the body member when in an unmated condition such that the terminating means moves outwardly and away from the outer surface of the module.

2. A cable connector according to claim 1 wherein the means permitting movement of the body member permits rotation of the body member.

3. A cable connector according to claim 1 wherein the means permitting movement of the body member permits translational movement of the body member perpendicular to the outer surface of the module.

4. A cable connector according to claim 1 wherein the cables to be interconnected are optical fiber cables and the cable connectors are optical fiber connectors.

5. A cable connector according to claim 2 wherein the cables to be interconnected are optical fiber cables and the cable connectors are optical fiber connectors.

6. A cable connector according to claim 3 wherein the cables to be interconnected are optical fiber cables and the cable connectors are optical fiber connectors.

7. A cable connector according to claim 1 wherein the cables to be interconnected are electrical leads and the cable connectors are electrical connectors.

8. A cable connector according to claim 2 wherein the cables to be interconnected are electrical leads and the cable connectors are electrical connectors.

9. A cable connector according to claim 3 wherein the cables to be interconnected are electrical leads and the cable connectors are electrical connectors.

10. A cable connector according to claim 2 wherein the body member has an elongate slot adapted to be received on a pivot bar whereby the slot permits movement of the body member in a mating direction while also permitting rotation of the body member in an unmated condition away from the outer surface of the module.

11. A cable connector as claimed in claim 1 further comprising an adapter for interconnection between the terminating means of the cable connector and a terminating means of the complementary cable connector.

12. A cable connector as claimed in claim 2 further comprising an adapter for interconnection between the terminating means of the cable connector and a terminating means of the complementary cable connector.

13. A cable connector as claimed in claim 3 further comprising an adapter for interconnection between the terminating means of the cable connector and a terminating means of the complementary cable connector.

14. A cable connector as claimed in claim 10 further comprising an adapter for interconnection between the terminating means of the cable connector and a terminating means of the complementary cable connector.

15. A cable connector as claimed in claim 1 wherein the means for constraining comprises:

a track in the outer surface of the module; and a runner on the body member adapted to engage the track; wherein the track is aligned to permit translation of the body member along a mating direction.

16. A cable connector as claimed in claim 3 wherein the means permitting movement comprises:

an elongate slot in the body member; and a pivot bar mounted on the module for engaging the slot; wherein the slot has a portion aligned perpendicular to the outer surface of the module.

17. A system for interconnecting a first cable in a first module to a second cable in a second module arranged adjacent to the first module such that an outer surface of the first module is substantially flush with an outer surface of the second module, each cable connector comprising:

terminating means for terminating an end of the respective cable;

a body member adapted to be mounted on the respective module outer surface and supporting the terminating means; and means permitting rotation of the body member such that the terminating means rotates outwardly and away from the respective module outer surface, wherein at least one of the body members is additionally constrained for movement parallel to the respective module outer surface for mating of the two cable connectors.

18. A cable connector for interconnecting a first cable in a module to a second cable, the cable connector comprising;

terminating means for terminating an end of the first cable;

a body member supporting the terminating means;

an adapter mating with the terminating means;

means for constraining the adapter to move parallel to an outer surface of the module for mating of the cable connector with a complementary cable connector attached to the second cable; and means permitting rotation of the body member, terminating means, and adapter when in unmated condition outwardly and away from the outer surface of the module.

* * * * *